United States Patent [19]
Hanai et al.

[11] Patent Number: 5,748,723
[45] Date of Patent: May 5, 1998

[54] TELEPHONE SYSTEM

[75] Inventors: Katsuyuki Hanai, Tama; Shogo Ayame, Fuchu, both of Japan

[73] Assignee: Toshiba Corporation, Kanagawa-ken, Japan

[21] Appl. No.: 766,279

[22] Filed: Dec. 13, 1996

Related U.S. Application Data

[63] Continuation of Ser. No. 401,042, Mar. 8, 1995, Pat. No. 5,602,904.

[30] Foreign Application Priority Data

Mar. 9, 1994 [JP] Japan ..................... 6-038342

[51] Int. Cl.⁶ ..................................... H04M 3/42
[52] U.S. Cl. ................. 379/198; 379/88; 379/201; 379/265; 379/309; 379/242; 379/246
[58] Field of Search ...................... 379/198, 88, 58, 379/59, 60, 201, 265, 309, 266, 207, 211, 212, 216, 127, 89, 142, 225, 245, 246, 242

[56] References Cited

U.S. PATENT DOCUMENTS

| | | | |
|---|---|---|---|
| 3,967,073 | 6/1976 | Anderson et al. | 379/127 |
| 4,951,310 | 8/1990 | Honda et al. | 379/266 |
| 5,008,930 | 4/1991 | Gawrys et al. | 379/211 |
| 5,033,079 | 7/1991 | Catron et al. | 379/127 |
| 5,062,103 | 10/1991 | Davidson et al. | 379/265 |
| 5,144,653 | 9/1992 | Masuoka | 379/266 |
| 5,216,703 | 6/1993 | Roy | 379/211 |
| 5,233,648 | 8/1993 | Nakamura | 379/211 |
| 5,268,958 | 12/1993 | Nakano | 379/265 |
| 5,329,523 | 7/1994 | Saito et al. | 379/265 |
| 5,329,578 | 7/1994 | Brennan et al. | 379/89 |
| 5,335,269 | 8/1994 | Steinlicht | 379/265 |
| 5,353,335 | 10/1994 | D'Urso et al. | 379/216 |
| 5,408,527 | 4/1995 | Tsutsu | 379/211 |
| 5,422,944 | 6/1995 | Sakai | 379/265 |

FOREIGN PATENT DOCUMENTS

6062113 A  3/1994  Japan.

*Primary Examiner*—Harry S. Hong
*Assistant Examiner*—Scott Wolinsky
*Attorney, Agent, or Firm*—Finnegan, Henderson, Farabow, Garrett & Dunner, L.L.P.

[57] ABSTRACT

A system and method for allocating an incoming call to a desired one of a plurality of destination candidates in response to data in at least one predetermined category concerning a caller, e.g. the area, the company or the department of the caller (a source address mode). There may be other modes such as a direct in line (DIL) mode and global mode. When a call is received by one of trunk circuits, the termination mode for the call is set for one associated with the trunk circuit that received the call. In case of the source address mode, the call is allocated to one of the destination candidates which is associated with the caller number or a part thereof. An association between a caller number (a part thereof) and a destination candidate is preferably achieved using a destination information table containing at least such information. In creating the table, designations of telephone or toll numbers of prospective callers are advantageously achieved by specifying data in at least one predetermined category concerning each caller.

54 Claims, 16 Drawing Sheets

FIG.4

| EXTENSION NO. | IDLE/BUSY |
|---|---|
| 3000 | 1 |
| 3010 | 0 |
| 3020 | 0 |
| 3210 | 0 |
| ⋮ | ⋮ |
| 6990 | 1 |

FIG.5

| TRUNK ID NO. | TERMINATION MODE |
|---|---|
| 001 | SOURCE NUMBER |
| 002 | SOURCE NUMBER |
| 003 | DIL |
| ⋮ | ⋮ |
| 099 | GLOBAL |

FIG.6

| ANALYSIS-TARGET NO. LENGTH | 5 | ANALYSIS STARTING DIGIT | 2 |
|---|---|---|---|

| ANALYSIS-TARGET NUMBER | THE KIND OF DESTINATION | EXTENSION NO. |
|---|---|---|
| 33425 | EXTENSION | 3210 |
| 42583 | EXTENSION | 3220 |
| 44345 | B BOARD | — |
| 11835 | ACD-G1 | — |
| 6542 | ACD-G2 | — |
| ⋮ | ⋮ | ⋮ |
| 99101 | EXTENSION | 6880 |

FIG.9

| ACD-G1 | |
|---|---|
| EXTENSION NO. | TERMINATION COUNT |
| 3010 | 5 |
| 3020 | 6 |
| 3030 | 3 |
| ⋮ | ⋮ |
| 3090 | 6 |

FIG.10

| ACD-G2 | |
|---|---|
| EXTENSION NO. | TERMINATION COUNT |
| 3100 | 8 |
| 3110 | 8 |
| 3120 | 6 |
| ⋮ | ⋮ |
| 3190 | 3 |

| DESTINATIONS |
|---|
| EXTENSION 3000 |
| EXTENSION 3010 |
| EXTENSION 3020 |
| ⋮ |
| B BOARD |
| ACD-G1 |
| ACD-G2 |

| SOURCE ADDRESS | THE KIND OF DESTINATION | EXTENSION NO. |
|---|---|---|
| 01 | ACD-G1 | — |
| 02 | ACD-G1 | — |
| 03 | ACD-G2 | — |
| 04 | ACD-G1 | — |
| ⋮ | ⋮ | ⋮ |
| 09 | EXTENSION | 3000 |

FIG.19

| | AREA NAME | SOURCE ADDRESS |
|---|---|---|
| DISTRICTS | A DISTRICT | 01 |
| | B DISTRICT | 02 |
| | ⋮ | ⋮ |
| | N DISTRICT | 09 |
| PREFECTURES | A PREFECTURE | 011~016 |
| | B PREFECTURE | 017 |
| | ⋮ | ⋮ |
| | N PREFECTURE | 098 |
| CITIES, TOWNS OR VILLEGES | A CITY (A PREFECTURE) | 0125 |
| | B CITY (A PREFECTURE) | 0166 |
| | ⋮ | ⋮ |
| | N TOWN (N PREFECTURE) | 09808 |

TELEPHONE SYSTEM

This is a continuation of application Ser. No. 08/401,042, filed Mar. 8, 1995, which issued as U.S. Pat. No. 5,602,904 on Feb. 11, 1997.

BACKGROUND OF THE INVENTION (1) Field of the Invention

The present invention relates to a telephone system which is applied to the private branch exchange (PBX) or the key telephone system and which connects an incoming call to an extension terminal responsive to the source address of the call.

(2) Description of the Prior Art

As connecting methods of calls incoming to a PBX, known are methods in which a destination is determined in a line-corresponding fashion (e.g., a direct in-line method in analog lines and a global terminating method in lines of an Integrated Services Digital Network (ISDN)) and methods in which a destination identifier is derived at the time of termination from the network and termination is made to an extension terminal corresponding to the identifier (e.g., a dialling-in method in analog lines, a direct in-dialling method in ISDN lines, and a terminating method by private lines). In these methods, each call is connected to a predetermined extension terminal without distinction of area of the source, which may cause troubles in tele-marketing, for example.

In a system in which a PBX 900 serves two groups of extension terminals (ACD group 1 and ACD group 2) under termination control by an automatic call distribution (hereinafter, referred to as "ACD") system as shown in FIG. 22, if the phone number (key number) of a tele-marketing telephone center is made known to customers as "XXXX-XX-XXXX", then a call from any area will be connected at random to one extension terminal of ACD group 1 or ACD group 2 served by the PBX 900. This prevents invoices from being pigeonholed on the spot in terms of receiving terminals even when a pigeonhole of invoices according to areas is desired. That is, the invoices had to be arranged by area after reception. Alternatively, in an announcement of the phone numbers of the tele-marketing telephone center to the customers, the phone numbers may be announced separately as "XXXX-XX-XXXX" to the customers in the east area of Japan and as "XX-XXX-XXXX" to the customers in the west area.

By doing this, as shown in FIG. 23 a call of a customer (in the east area) who dialed XXXX-XX-XXXX would be connected through the PBX 900 to an extension terminal of the ACD group 1 and a call of a customer (in the west) who dialed XX-XXX-XXXX would be connected through the PBX 900 to an extension terminal of the ACD group 2. Thus, the invoices can be pigeonholed by ACD groups according to the areas of the sources.

However, since customers do not necessarily call a predetermined phone number, customer's call may be connected to a wrong ACD group according to the technique described above. That is, it is a problem to the customers that they are forced to dial a predetermined phone number and it is a problem to the distributor that every call is not necessarily connected to an extension terminal of its associated ACD group.

SUMMARY OF THE INVENTION

It is an object of the present invention, which has been made in view of the foregoing problems in the above prior art, to provide a telephone system which can connect an incoming call to a predetermined extension terminal corresponding to the source address of the incoming call.

It is another object of the invention to provide a telephone system which can connect an incoming call to a predetermined extension terminal group corresponding to the source address of the incoming call.

It is further object of the invention to provide a telephone system which facilitates classification of the sources by areas and association of each source with a desired extension terminal or extension terminal group.

These and other objects are achieved in accordance with a present invention which, in one aspect, is a system and method for allocating an incoming call to a desired one of a plurality of destination candidates in response to data in at least one predetermined category concerning a caller of the incoming call in a private switched telephone system in which an exchange is connected to the plurality of destination candidates and has at least one trunk which is connected to a public switched telephone network (PSTN) which provides a source address of the caller with the incoming call. By registering a correspondence between data in the at least one predetermined category concerning each of prospective callers and a desired one of the plurality of destination candidates, a destination information table is automatically created. Each record of the destination information table at least contains as an entry an analysis target part of a source address of each of the prospective callers and further comprises at least an ID of the desired one of the destination candidates. In response to which of the at least one trunk the incoming call has come through, a termination mode is selected from a plurality of predetermined termination modes. If the selected termination mode is a source address mode, the incoming call is allocated to the destination candidate associated in the destination information table with the entry identical to the analysis target part of the source address provided from the PSTN.

BRIEF DESCRIPTION OF THE DRAWINGS

FIG. 4 is a memory table which contains idle/busy information of the extension terminals and which is stored within the PBX of FIG. 2;

FIG. 5 is a termination mode table stored within the PBX of FIG. 2;

FIG. 6 is a diagram showing data stored within the PBX of FIG. 2;

FIGS. 9 and 10 are memory tables stored within the PBX of FIG. 2;

FIG. 19 is an exemplary caller data table for relating each of the possible caller's data in a predetermined category (e.g. the area names of potential callers) to the source address (toll number) of a call from the caller;

DETAILED DESCRIPTION

Figure 1:
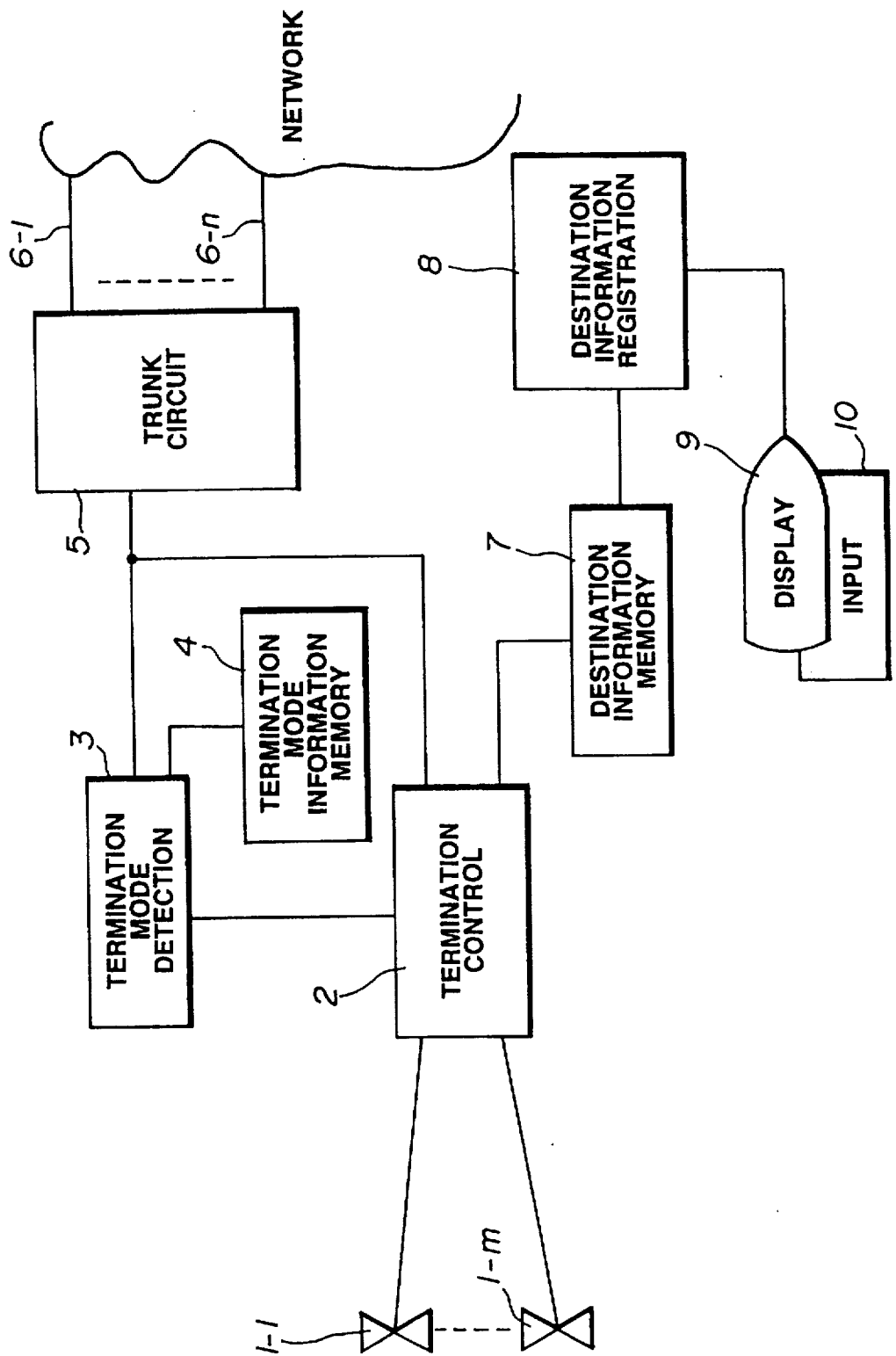
FIG. 1 is a block diagram showing an arrangement of an embodiment of a telephone system according to the invention.

The following will describe telephone systems or PBX's according to illustrative embodiments of the invention in conjunction with the accompanying drawings. In the drawings, like elements are given like reference numbers and repetitive explanations of such elements will be omitted. FIG. 1 shows an arrangement of a PBX according to an illustrative embodiment of the invention. In FIG. 1, a plurality of extension terminals 1-1 through 1-m are given terminating connections by a termination control means 2. When an incoming call reaches a trunk circuit 5 through one of trunks 6-1 through 6-n connected to a network, the circuit 5 receives a source address (a source telephone number) from the network. If the network is an ISDN network, a source address transmitted through a control channel includes a toll number which is assigned to each of the areas into which the whole country is divided by cities, towns, and/or villages.

If the network is an analog network, a source address in the facsimile (transmitting) procedure includes a toll number which is assigned to each of the areas into which the whole country is divided by cities, towns, and/or villages. When there is an incoming call in any of trunks 6-1 through 6-n, the trunk circuit 5 sends information indicative of which trunk has received the call to termination mode detecting means 3 and at the same time, the source address is sent to the termination control means 2. Connected to the termination mode detecting means 3, is termination mode memory means 4. Here, a termination mode table equivalent to the termination mode memory means 4 is shown in FIG. 5. The termination mode table shown in FIG. 5 is an example in case of trunks 6-1 through 6-n being labeled with the identification numbers 001 through 099 wherein contained are pairs of each identification number and a corresponding one of the termination modes, a source number mode (in which an incoming call is connected to an extension terminal corresponding to the source address of the call), a DIL (direct in line) mode, and a global termination mode. Then, the termination mode detecting means 3 searches the termination mode memory means 4 to detect the relevant mode on the basis of the information sent from the trunk circuit 5 and indicating which trunk has received the incoming call, and sends the information indicative of the detected termination mode to the termination control means 2.

Figures 7, 8:
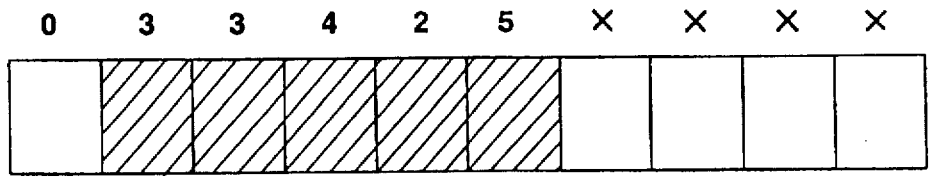
FIG. 7 is a destination information table stored within the PBX of FIG. 2.
FIG. 8 is a diagram illustrating how the digits to be analyzed are found in the PBX of FIG. 2.

On the other hand, connected to the termination control means 2, is a destination information memory means 7. FIG. 7 shows an exemplary destination information table equivalent to the destination information memory means 7. Contained in the table, are the analysis-target numbers which each constitute a part of a source number, the kinds of respective destinations, and, if the kind of the destination is an extension terminals, extension numbers of the corresponding extension terminals, associated with one another. For example, this table shows that when an analysis-target number is "33425", the call is connected to the extension terminal with the extension number "3210" and when an analysis-target number is "11835", the call is connected to an extension terminal of the ACD group 1 (ACD-G1). Thus, when the termination control means 2 receives the information indicating the source number mode from the termination mode detecting means 3, the means 2 searches the destination information table 7 on the basis of a source address sent from the trunk circuit 5 and detects a destination extension terminal or terminal group to effect a termination connection to the detected destination. It is noted that the destination information table 7 also contains information on destinations according to other termination modes than the source number mode, that is, destinations according to the DIL (direct in line) mode and the global termination mode. Therefore, when given information indicating that other termination mode than the source number mode should be used, the termination control means 2 derives information on the source according to the corresponding termination mode from the destination information table 7 regardless of the source address sent from the trunk circuit 5 to perform termination control by the DIL or global termination mode.

To the destination information table 7 there is coupled a destination Information register means 8, to which display means 9 for displaying information and input means 10 for inputting information are connected. When a request to the destination information table 7 for registration of destinations corresponding to source addresses is input through the input means 10, in response to the request, the destination information register means 8 displays the area indicating part, the prefecture indicating part and the city/town/village indicating part of the source address on the display means, prompts a selection of which part to associate with an extension terminal or an extension terminal group and registers the selected part of the source address and the extension terminal or extension terminal group input through the input means 10 associating with each other in the destination information table 7.

Figure 2:
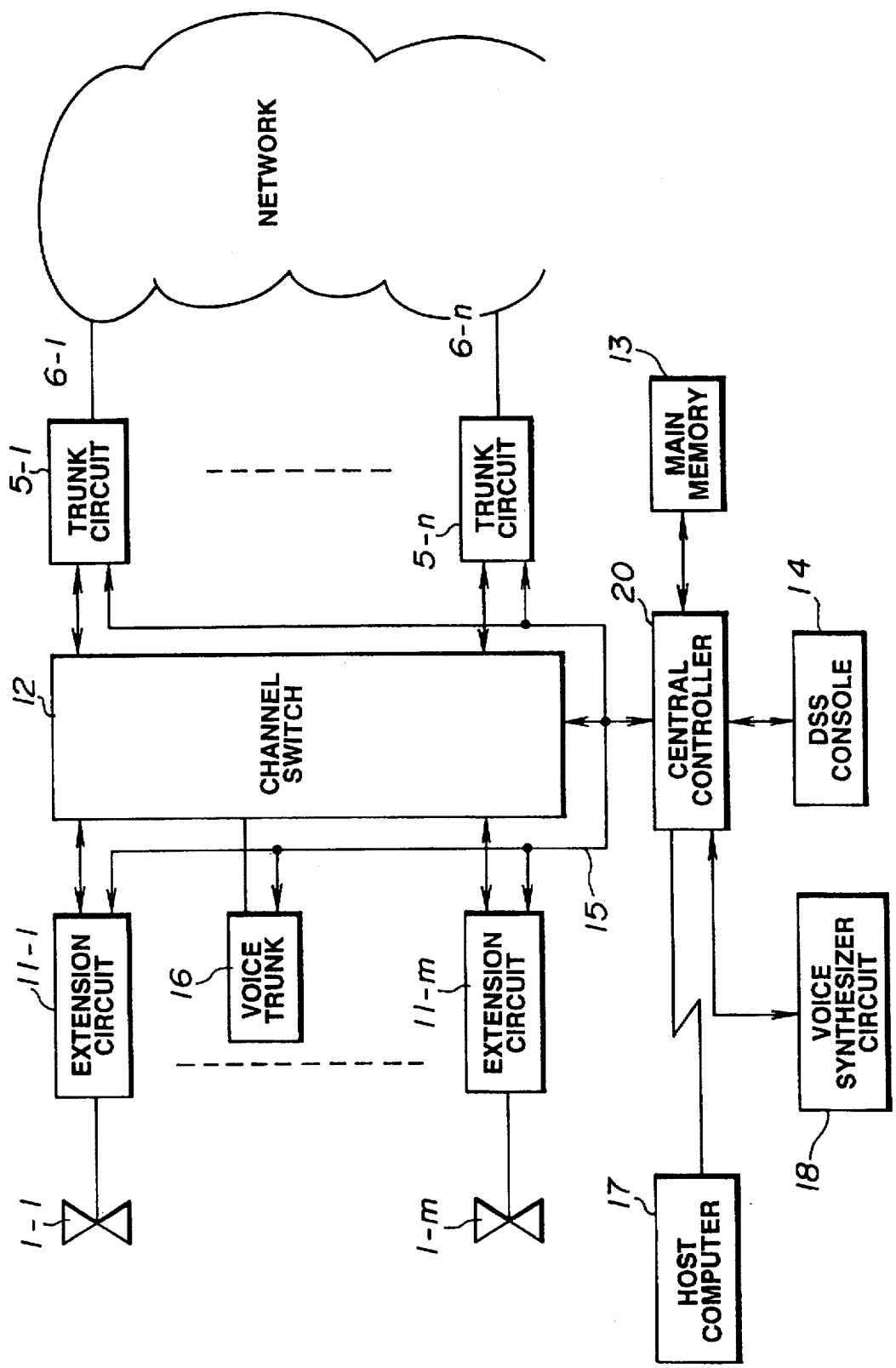
FIG. 2 is a block diagram showing an arrangement of a PBX in an embodiment of a telephone system according to the invention.

Turning now to FIG. 2 there is shown an illustrative PBX system which corresponds to the PBX in FIG. 1 and which is yet more practical. Extension terminals 1-1 through 1-m are connected to extension circuits 11-1 through 11-m, while trunks 6-1 through 6-n are connected to trunk circuits 5-1 through 5-n. Under the control of a central controller 20, voice channels are established by a channel switch 12 between any pairs of extension circuits 11-1 through 11-m and between extension circuits 11-1 through 11-m and trunk circuits 5-1 through 5-n. The central controller 20, which comprises a microprocessor for example, receives a source address from trunk circuits 5-1 through 5-n and also receives information on a hook state and key operations from extension circuits 11-1 through 11-m, while supplies origination control information and dial information to trunk circuits 5-1 through 5-n to cause it to originate the call, supplies termination information to extension circuit 11-1 through 11-m to cause it to effect termination, supplies display control information to LCD or LED to cause it to display necessary information, and supplies control signals to the channel switch 12 to control establishment and dissolution of channels. A voice trunk 16 is intended for giving an announcement of wait state in voice when the destination extension terminal is busy, and will be connected via channel switch 12 to extension circuits 11-1 through 11-m or trunk circuits 5-1 through 5-n in such a case.

Central controller 20, to which main memory 13 is connected, controls each element using control programs and data stored in the main memory 13.

Figure 3:
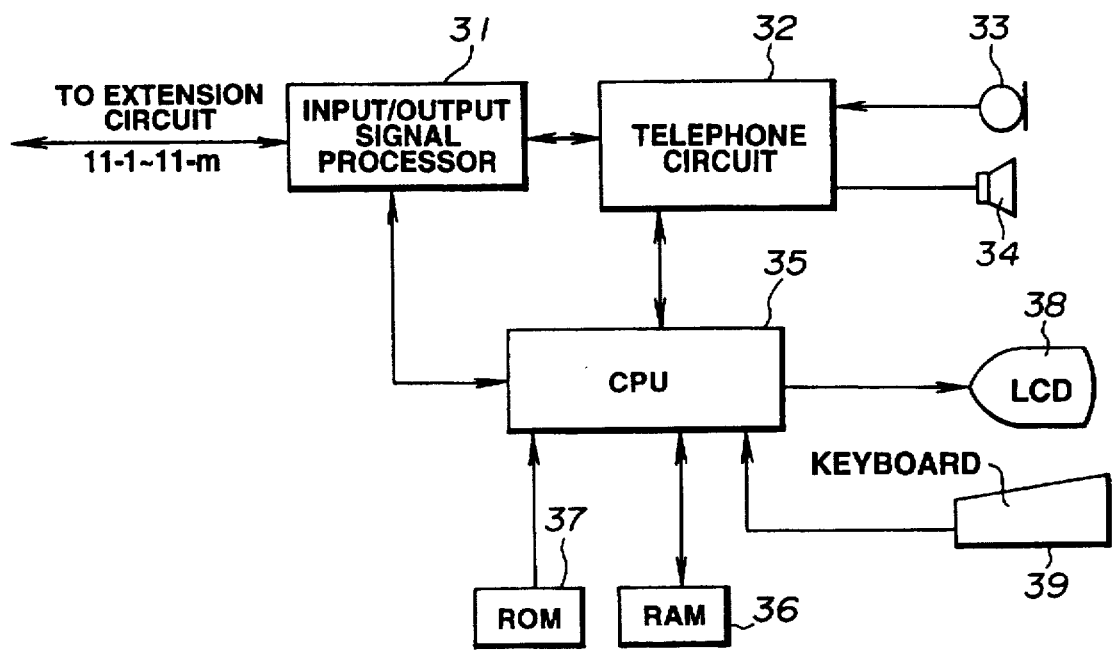
FIG. 3 is a block diagram showing an arrangement of an extension terminal.

In the main memory 13 there are included various kinds of memory tables such as above described termination mode table 4 and destination information table 7, areas for working registers, and information on time differentials as described below, carriage and postage on a country basis, exchange rates and tax rates (sales or purchase tax rates). Further, in the main memory 13 there are included: the source addresses classified by departments of source companies, the extension terminals 1-1 through 1-m to which a call is to be connected in response to each of the source address; the source addresses classified by a plurality of areas, the extension terminals assigned to a plurality of area departments of a shipping center according to the classification; the source addresses classified by companies or individuals and the extension terminals classified accordingly. Further, since the central controller 20 has DSS console 14 connected to it, supplying information from the DSS console 14 to the central controller 20 enables read and write of information from and to the main memory 13. The DSS console 14 serves as destination information register means 8, display means 9, input means 10 as shown in FIG. 1. Also, as described above, to the central controller 20 there is connected a host computer 17 for performing centralized reception transaction in tele-marketing in which an ACD system is adopted. Further, as described above, to the central controller 20 there is connected a voice synthesizer circuit 18 in which there is stored voice information for giving a response in a foreign language in tele-marketing in which an ACD system is adopted—for example, a formal greetings in case of congestion in lines. FIG. 3 shows a key telephone system applicable to each of the extension terminals 1-1 through 1-m. An input/output signal processor circuit 31 connected to each of the extension circuits 11-1 through 11-m is connected to a telephone circuit 32 for amplifying telephone transmitting and receiving signals, and processing sidetone. To the telephone circuit 32 there is connected a microphone 33 and a loudspeaker 34 which constitute a handset, through which transmission and reception of voice is achieved. A CPU 35 for controlling the key telephone system is also connected to the input/output signal processor circuit 31 and the telephone circuit 32 and performs its control operation with a control program stored in ROM 37. And, the CPU 35 is provided with working RAM 36, an liquid crystal display (LCD) 38 and a keyboard 39 to display the state of process with the LCD 38 and to input telephone numbers and select various functions through the keyboard 39.

Figure 11:
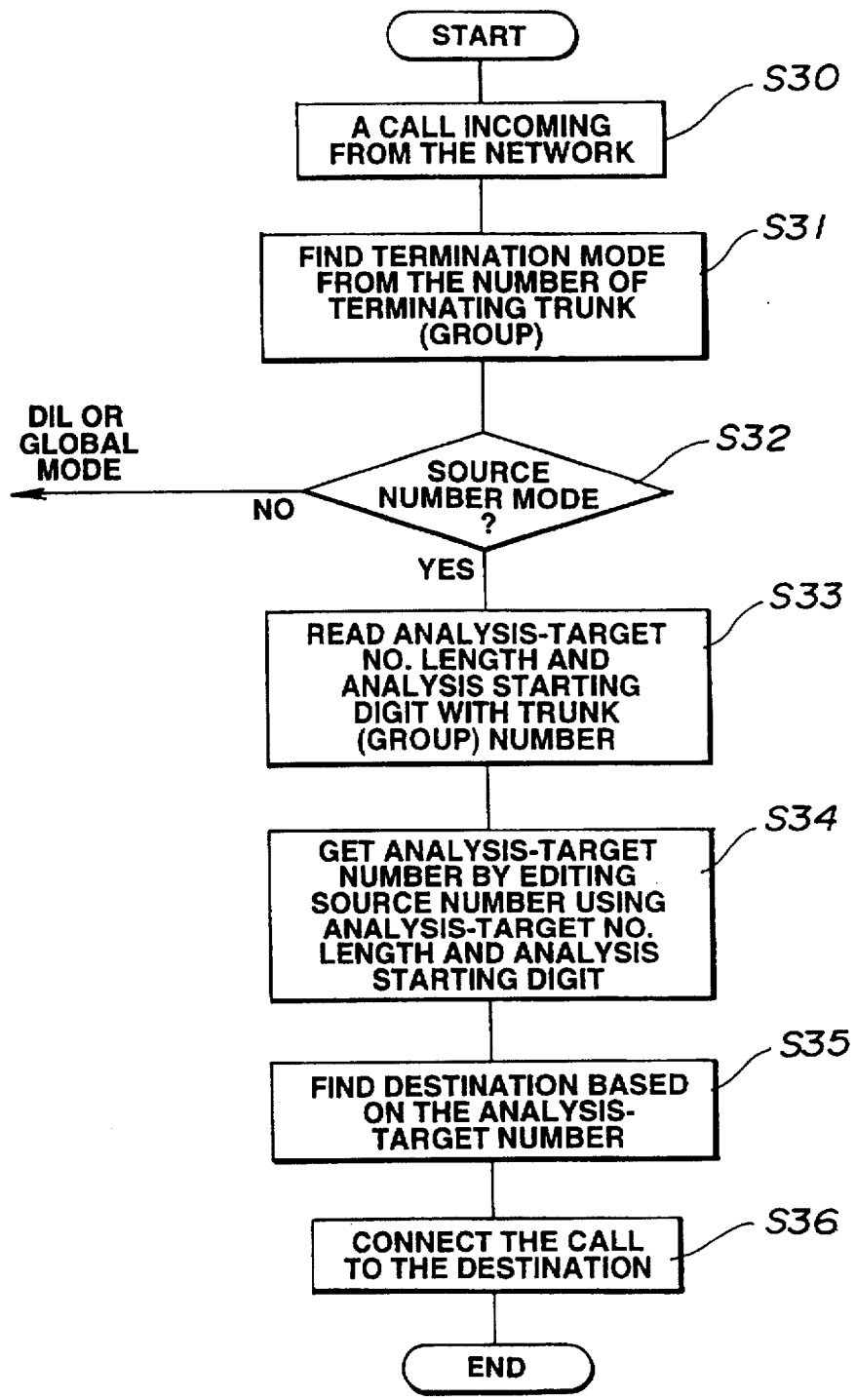
FIGS. 11 through 13 are flow charts showing a procedure of operation of the PBX of FIG. 2.
Figure 12:
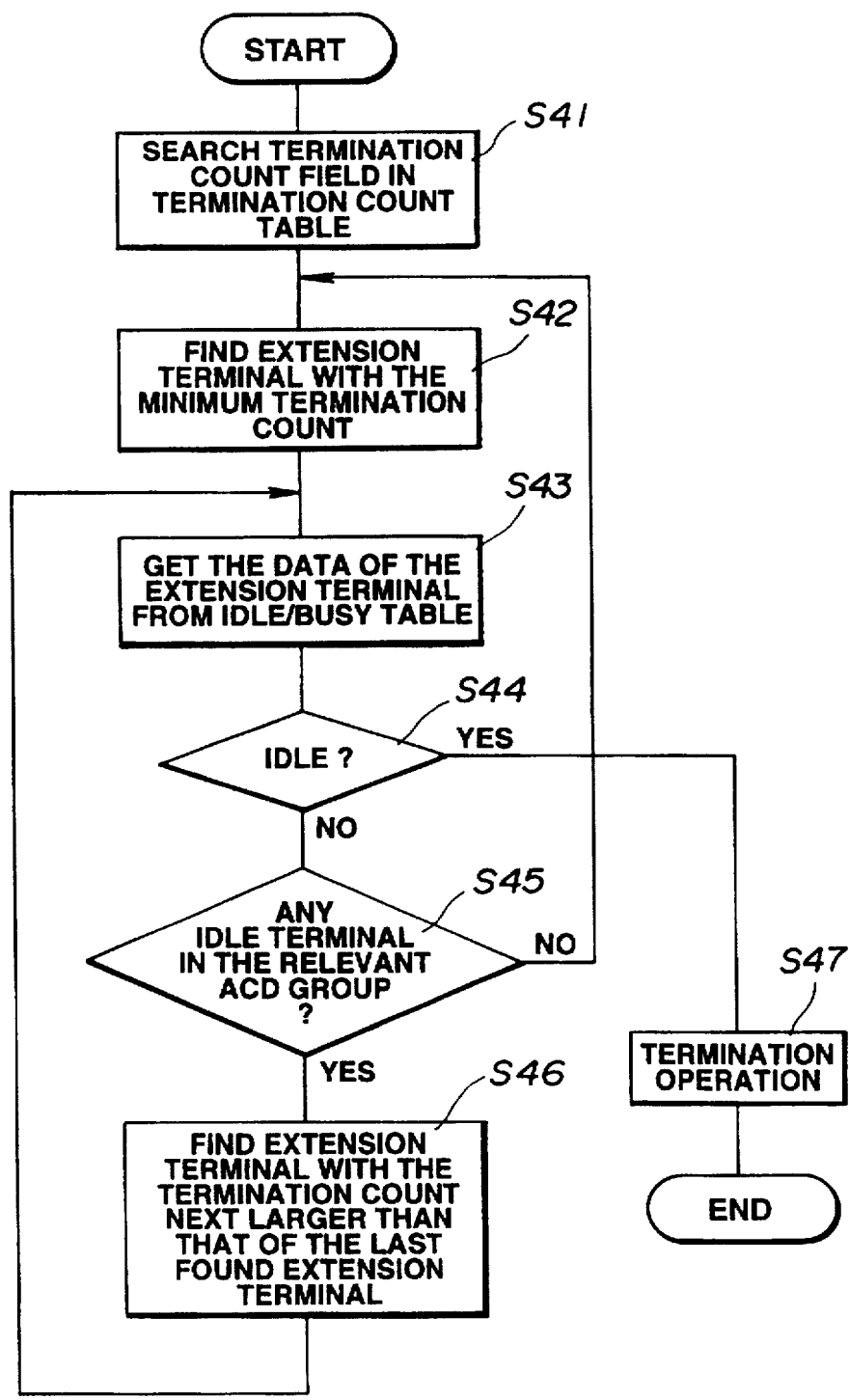

In a PBX arranged as described above, the main memory 13 is provided with an idle/busy memory table shown in FIG. 4, a memory table shown in FIG. 5 for finding a termination mode from a trunk identification (ID) number, a register shown in FIG. 6 for storing information indicating which part of the source address to make an analysis-target number, a memory table shown in FIG. 7 for finding a destination from an analysis-target number, a register shown in FIG. 8 for obtaining an analysis-target number therefrom, a memory table shown in FIG. 9 for storing the extension numbers of the extension terminals of group 1 in an ACD termination system and the counts of terminations by respective terminals in the ACD system, a memory table shown in FIG. 10 for storing the extension numbers of the extension terminals of group 2 in an ACD termination system and the counts of terminations by respective terminals in the ACD system. Further, the main memory 13 stores a program shown in flow charts of FIG. 11 and 12, with which the central controller 20 effects control. The following will describe operation of a PBX according to the embodiment on the basis of the flow charts of FIG. 11 and 12.

When a termination is found from one of trunks 6-1 through 6-n, the corresponding one of trunk circuits 5-1 through 5-n notifies the termination to the central controller 20 via bus 15. At this time, the central controller 20 derives the trunk ID number and the source address from the trunk circuit and holds them to find a termination mode based on the trunk ID number from the table as shown in FIG. 5 in the main memory 13 (steps S30 and S31). The central controller 20 detects if the trunk operates in a source number mode (step S32). If the source number mode is not used, the central controller 20 performs termination control of DDI or global termination mode according to the detected termination mode with respect to a predetermined one of extension terminals, 1-i (i=1,2 . . . ,n), through bus 15 and corresponding extension circuit 11-i. If the use of source number mode is detected in step S32, an analysis-target number length and an starting digit associated with the trunk ID number is read out (S33). However, for the purpose of simplicity of explanation, it is assumed in the illustrative embodiment that if the source number mode is used, the analysis-target number length and the starting digit for every trunk using this mode are set for the fixed values "5" and "2" respectively in a register in the main memory 13 regardless of the trunk ID number. Then, the central controller 20 derives the analysis-target number length "5" and the starting digit "2" from the register and edits the source address being held as described above to obtain an analysis-target number (S34).

Specifically, assuming the received source address to be "03-3425-XXXX" as shown in FIG. 8, the source address is set from the leading digit in a ten-digit register shown in FIG. 8 in the main memory 13 and adapted as an analysis-target number is the successive digits which starts from the second digit of the source address since the starting digit=2 and which consists of 5 digits, that is, extends to the sixth digit since the analysis-target number length=5. Thus, as shown in FIG. 8, slant-lined digits stored in the register becomes an analysis-target number. It should be noted that in view of a local call, as a part of "the edition", a test is made to see if the leading digit of the source address is "0", and if not, a "0" is prefixed to the source address before it is set from the leading digit in the 10-digit register shown in FIG. 8 in the main memory 13. Then, the central controller 20 refers to the memory table as shown in FIG. 7 in the main memory 13 based on the obtained analysis-target number for a destination (S35). For example, as the analysis-target number is 33425 in the example shown in FIG. 8, the destination is found from the memory table of FIG. 7 to be the extension terminal with the extension number 3210. Next, the controller 20 detects the idle/busy state of the extension terminal (the extension number 3210) from the memory table of idle/busy information in FIG. 4. Assuming that numeral "0" denotes idle state and numeral "1" denotes busy state in the table, the extension terminal of No. 3210 is idle as seen from the table in FIG. 4. Then, the central controller 20 invokes the extension terminal of No. 3210 through bus 15 and one of extension circuits 11-1 through 11-m (S36). On the other hand, if the extension terminal is busy, the controller 20 returns busy information through the trunk that received the call. Moreover, by the central controller 20 obtaining information about hooks through extension circuits 11-1 through 11-m, on the basis thereof to update idle/busy data in the memory table of FIG. 4, the memory table is so arranged that it reflects the current state of each extension terminal.

Though the destination was a single extension terminal in the above example, if the analysis-target number is for example 11835, then the destination will become ACD group 1 as seen from the memory table in FIG. 7. In this case, the central controller 20 finds an extension terminal which belongs to ACD group 1 from the memory table of FIG. 9 in the main memory 13 by executing a termination control of the ACD system according to the program of the flow chart shown in FIG. 12.

Specifically, the controller 20 searches a termination count field of each extension terminal in the memory table of FIG. 9 (S41) to find the extension terminal with the minimum termination count (S42). The controller 20 obtains information on whether the extension terminal is idle or not (S43) and test it to see if it is idle (S44). If so, the same termination operation as described above is performed (S47). Otherwise, the controller 20 makes a test to see if there is any idle extension terminal in ACD group 1 using the memory tables of FIG. 9 and 4 (S45) and if not, returns to step S42 to continue searching until any of the extension terminals enters idle state. During this period, the controller 20, of course, announces the wait state by connecting the voice trunk 16 and the trunk circuit which received the call with a channel. When any of the extension terminals of ACD group 1 enters Idle state in the course of an wait state, the controller 20 finds the extension terminal with the termination count next larger than that of the last found extension terminal (S46), proceeds to step S43 to get information on the idle/busy state of the found extension terminal from the memory table of FIG. 4 (S43), and make a test to see if the terminal is idle (S44). If so, the same termination operation as described above is performed (S47) and the termination count of the extension terminal is incremented. It is noted that if the destination is ACD group 2, a termination control according to the ACD system is executed using a memory table in FIG. 10.

Figure 13:
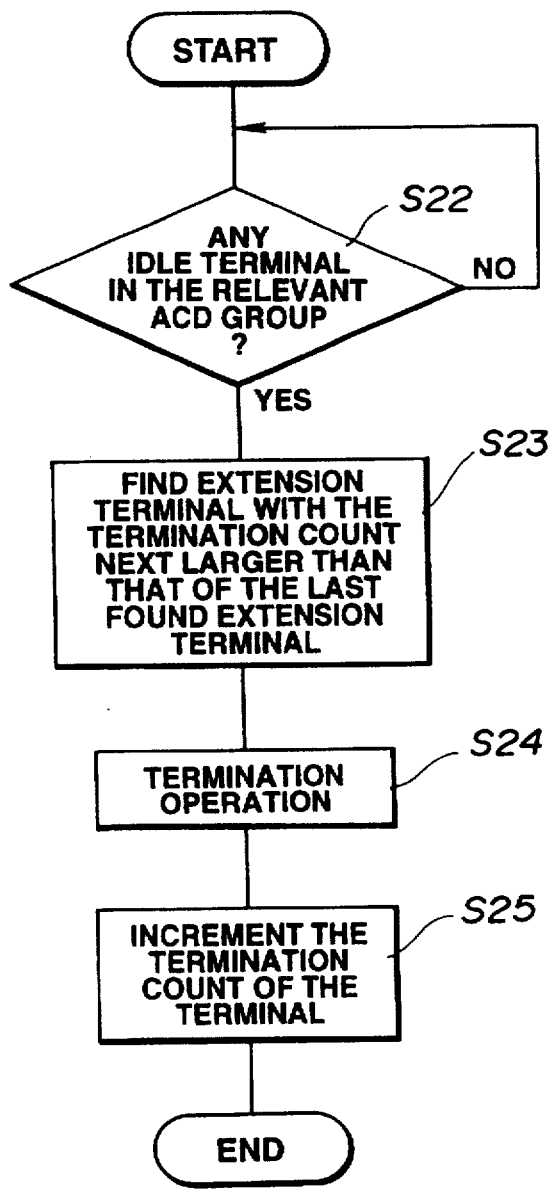

Turning now to FIG. 13 there is shown another illustrative embodiment of a termination control according to the ACD system. When this termination control is to be adopted, the program of the flow chart as shown in FIG. 13 has to be stored in the main memory 13. When a call is incoming through any of trunks 6-1 through 6-n, the termination mode associated with the trunk is found to be a source number mode, and the destination is found to be ACD group 2 for example, the controller 20 searches the idle/busy memory table of FIG. 4 in main memory 13 with respect to the terminal found in the memory table of FIG. 10 in main memory 13 to make a test to see if there is any idle extension terminal in ACD group 2 (S22). If there is no such extension terminal, a wait state is entered. On the other hand, if the idle state of any extension terminal of the ACD group 2 is found, the controller 20 sorts the idle extension terminals in order of termination count from the minimum one for saving in the working area of the main memory 13 (S23), performs a termination operation in the same way as described above with respect to the extension terminal which is in idle state and has the minimum termination count (S24), increments the termination count of the extension terminal in the main table of FIG. 10 (S25) and returns to the main process.

Figure 14:
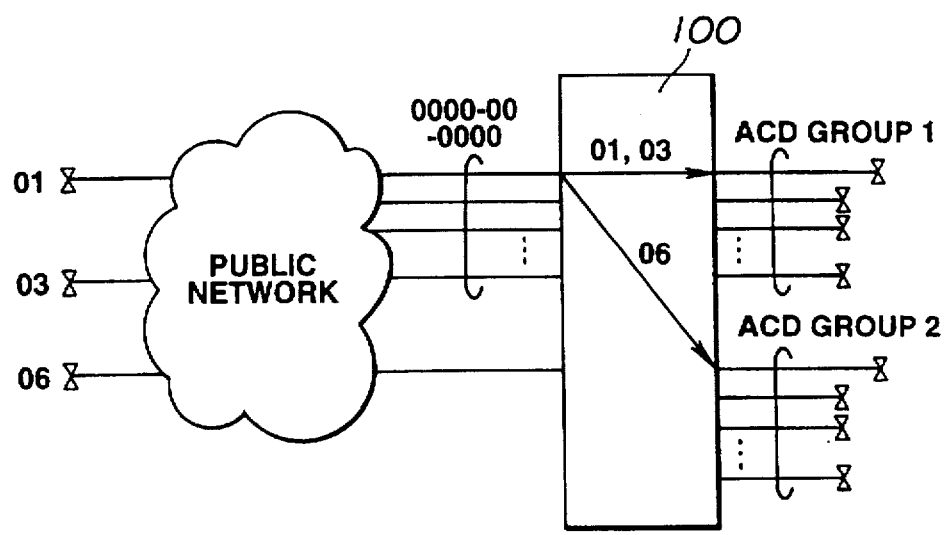
FIG. 14 is a diagram illustrative of termination control operation in an embodiment of a telephone system according to the invention.

In FIG. 14 there is shown how PBX 100 according to the embodiment of the invention distributes incoming calls, where it is assumed that the calls with the source address of 01 or 03 have their destination set for ACD group 1 and the calls with the source address of 06 have their destination set for ACD group 2. Even when calls are originated to the same telephone number "XXXX-XX-XXXX", the calls have their destination separated by areas of their sources, which is especially convenient for a pigeonhole of invoices in telemarketing.

Figure 15:
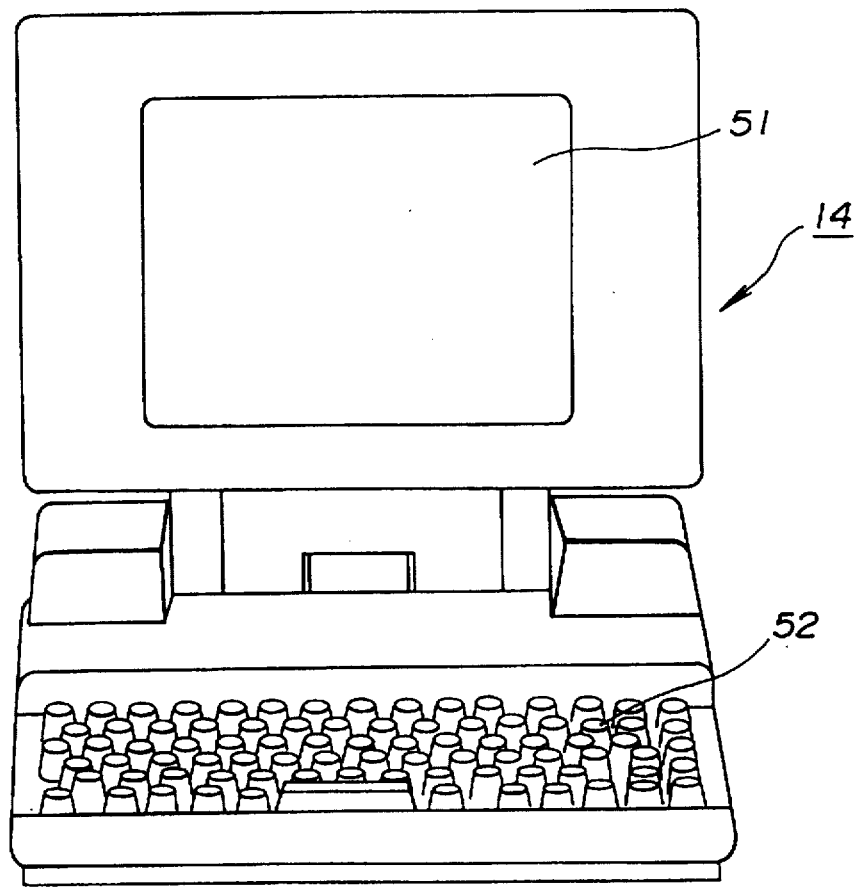
FIG. 15 is a perspective illustration showing an external arrangement of a DSS console connected to the PBX of FIG. 2.

FIG. 15 shows a perspective view of an exemplary DSS 14 console with which a PBX of the invention is provided. The DSS console 14 comprises a computer provided with for example a display device 51 such as an LCD and a keyboard input device 52. An illustrative arrange of the computer is shown in a block diagram of FIG. 16. The DSS console 14 is provided with CPU 50 and main memory 53 in which a control program and data used by CPU 50 are stored and which has areas for working registers. To CPU 50 there is connected BUS 54, to which interface circuits 55 and 56 and RS-232C interface circuit 57 are connected. To interface circuits 55 and 56 there are connected a display device 51 and a keyboard input device 52, respectively. CPU 50 receives input data from the keyboard input device 52 to execute a process and displays on the display device 51. The RS-232C interface circuit 57 is connected through an RS-232C cable to an RS-232C interface circuit 29 of the central controller 20 of the PBX, enabling bidirectional data communication between CPU 50 and the central controller 20. Also, a timer circuit 60 is connected to BUS 54 for timing the present time. A printer 62 for printing is also connected through the interface circuit 61 to BUS 54.

Figures 17, 18:
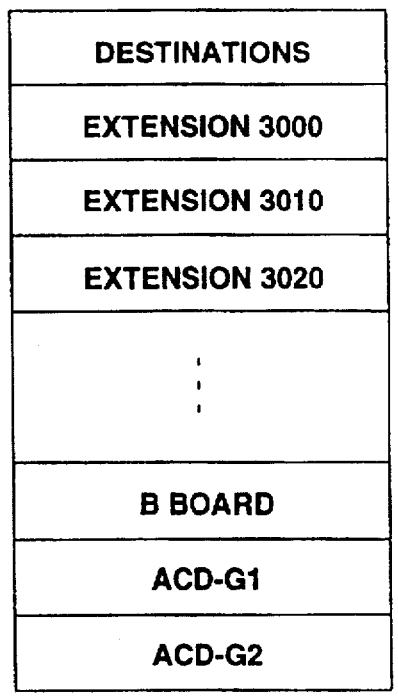
FIG. 17 shows an exemplary destination candidate table stored in the DSS console of FIG. 15.
FIG. 18 is an exemplary source address-destination candidate table stored in the DSS console of FIG. 15.
Figure 20:
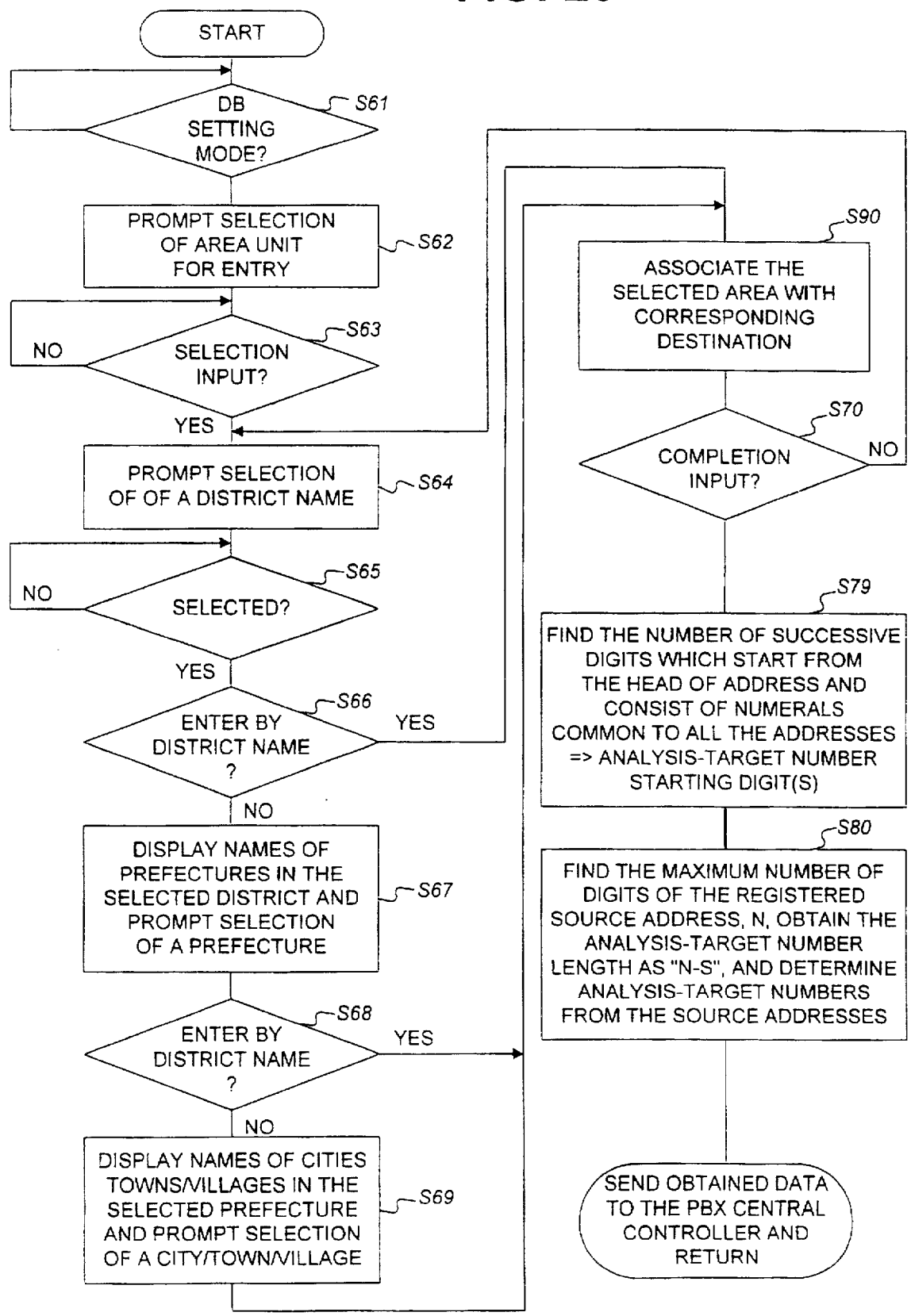
FIG. 20 is a flow chart showing a procedure of operation of the DSS console of FIG. 15 in case of associating the area name of each caller with a part of the source address or toll number of the caller.
Figure 21:
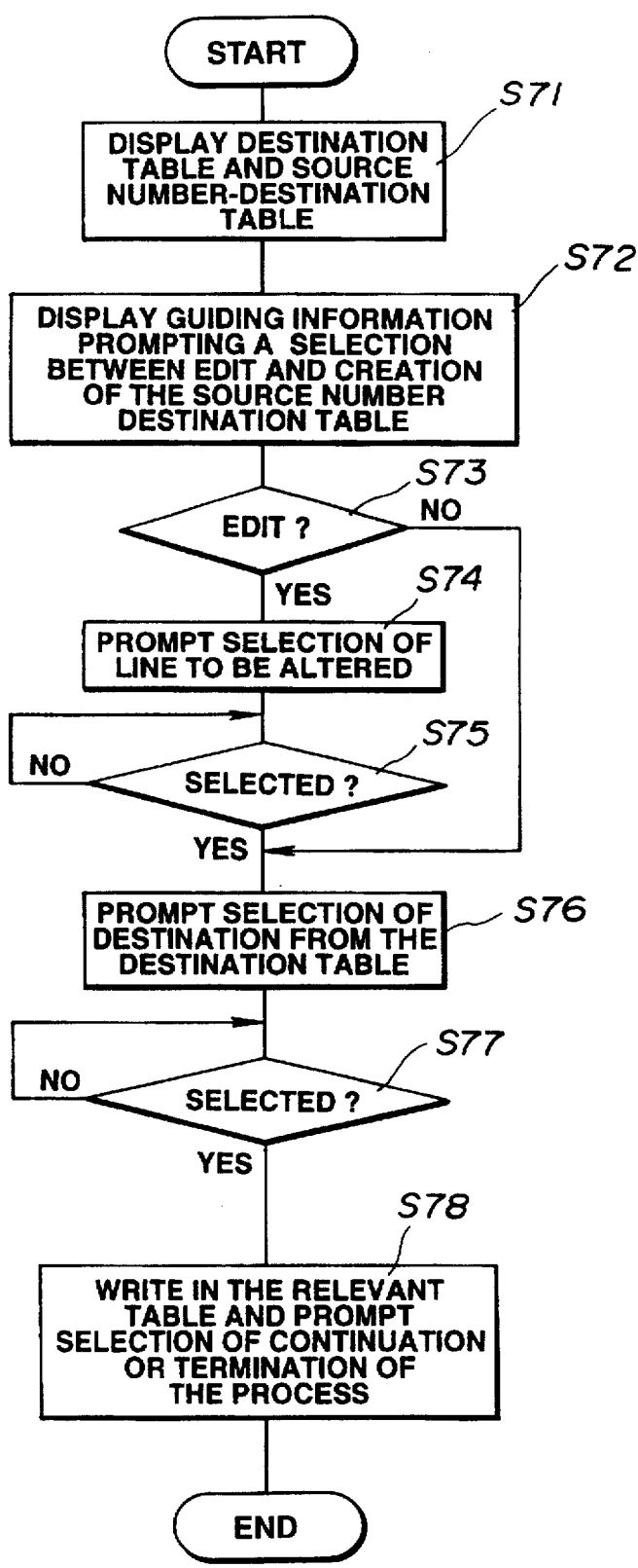
FIG. 21 is a flow chart showing a procedure of operation of the DSS console of FIG. 15 case of associating the area name of each caller with a part of the source address or toll number of the caller.
Figure 22:
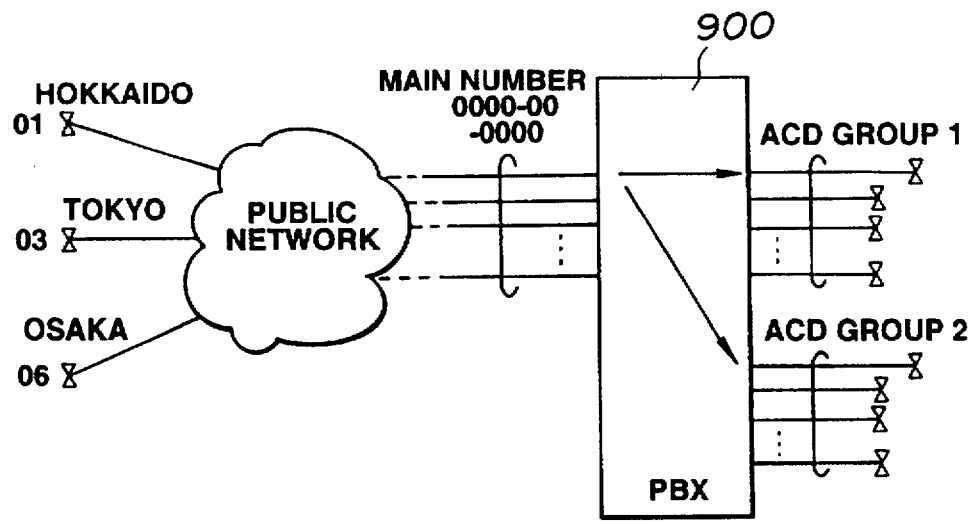
FIGS. 22 and 23 are diagrams for explaining termination control operation in a prior art PBX.
Figure 23:
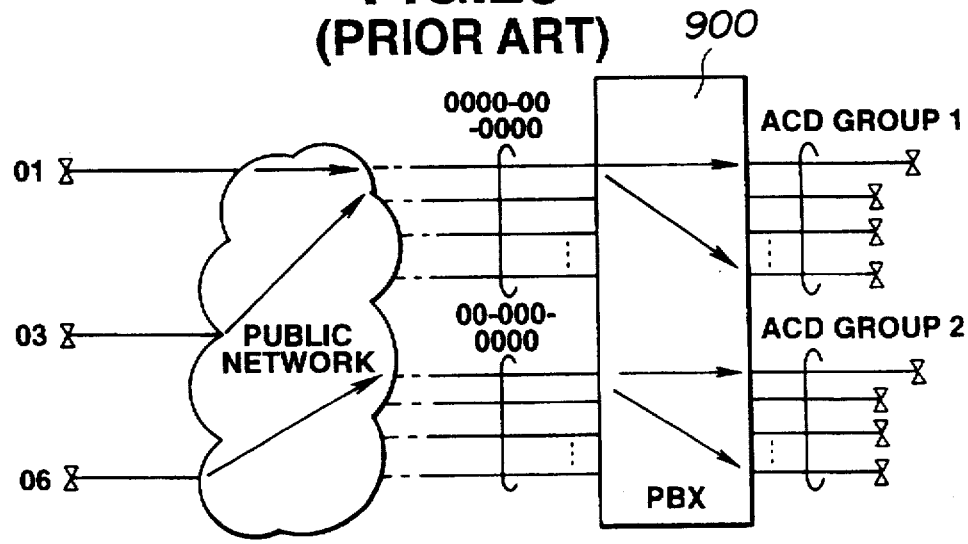

In main memory 53 there is stored information on the destinations served by PBX to which the DSS console 14 is connected, as classified into extension terminals, a B board, ACD groups and so on in a table form as shown in FIG. 17. Also, in main memory 53 there are stored a memory table for associating each source address with the kind of its destination and its extension number (if the destination is an extension) as shown in FIG. 18 and a caller data table for relating each of the possible caller's data in a predetermined category, e.g. the area names of potential callers to the source address (toll number) of a call from the caller, in which the areas are classified into districts, prefectures, and cities/towns/villages as shown in FIG. 19. Further, main memory 53 is provided with a control program for registering information about destinations to associate the possible caller's data in a predetermined category, that is, parts or the whole of the source addresses of the potential callers with the destination candidates in PBX according to flow charts as shown in FIG. 20 and 21. Taking a case of relating the areas from which incoming calls are originated with the destination candidates, control operation for registering information about destinations in PBX will be described referring to FIG. 20 and 21 in the following.

In FIG. 20, a predetermined key on the keyboard input device 52 of DSS console 14 is set for a data base (DB) setting mode key, which CPU 50 is monitoring (S61). When the DB setting mode key is operated, CPU 50 reads from main memory 53 a guiding information for asking on the basis of which area unit of district, prefecture and city/town/village the user would like to input and set information on destinations, sends the guiding information through interface circuit 55 to the display device 51 for display (S62), and waits for selection input (S63). As the optional items are displayed each accompanied by a numeral in step S62, the selection input can be done by operating ten-keys. In response to the selection, CPU 50 saves which area unit to use in a working area of main memory 53, derives a part of information divided by district names from the memory table in FIG. 19 to send it with guiding information for prompting a selection of a district name through BUS 54 and interface circuit 55 to the display device 51 for display (S64), and waits for selection input (S65). Though this selection is done with a cursor key, in another embodiment it may be done by operating a pointing device such as a mouse connected to DSS console 14.

When a district name is selected, CPU 50 refers to the working area of main memory 13 for the area unit to see if the entry is to be done in terms of district name (S66). If so, CPU 50 proceeds to step 90, where a process of association with destination is executed. Otherwise, CPU 50 derives prefecture names corresponding to the district name selected in step 66 and source addresses corresponding to the prefecture names from the memory table in FIG. 19, sends them with guiding information prompting a selection of any of the prefecture names through BUS 54 and interface circuit 55 to the display device 51 for display (S67), and waits for selection input. When a selection is done, CPU 50 refers to the working area of main memory 13 for the area unit to see if the entry is to be done in terms of prefecture name (S68). If so, CPU 50 proceeds to step 90, where a process of association with destination is executed. If it is found that the entry is to be done in terms of city/town/village name in step S68, CPU 50 derives city/town/village names corresponding to the prefecture name selected in step 68 and corresponding source addresses from the memory table in FIG. 19, sends them with guiding information prompting a selection of any of the city/town/village names through BUS 54 and interface circuit 55 to the display device 51 for display (S69), and proceeds to step 90, where a process of association with destination is executed. After completing a process of association with destination, CPU 50 makes a test to see if there has been a key input indicating the completion of setting information on destinations (S70). If not, CPU 50 goes back to step S64 to continue the process. If the setting has been completed, CPU 50 sends information on the setting through RS-232C interface circuit 57 to the central controller 20 of PBX and returns to the main process. In the above process, it is assumed that the prefectures belonging to a district are found using source address and city/town/village names belonging to a prefecture are found using prefecture names which have been added to each of the city/town/village names.

FIG. 21 shows details of a process of association with destination in step S90 shown in FIG. 20. CPU 50 reads from main memory 53 data in the destination memory table shown in FIG. 17 and data in the source address (source number) versus destination table shown in FIG. 18, and sends them through interface circuit 55 to the display device 51 for display (S71). It should be noted that the source address (source number) versus destination table shown in FIG. 18 is a one in case when setting has been done beforehand, so data are not set in the memory table if setting has not been done beforehand. Then, CPU 50 reads from main memory 53 guiding information prompting a selection between edit and creation of data of the source address (source number) versus destination table shown in FIG. 18, displays the information in a part of the picture by the above mentioned display, and waits for selection (S72). Since the optional items are displayed each accompanied by a numeral in step S72, selection input can be achieved by operating ten-keys on the keyboard. Detecting a selection input, CPU 50 determines if the selection input was intended for edition (S73). If so, CPU 50 reads from main memory 53 data for guiding display prompting selection of a line to be edited of the source address (source number) versus destination table shown in FIG. 18, makes the guiding display in a part of the screen which has been displayed in step S72 (S74), and waits for selection (S75). Though this selection is done with a cursor key, in another embodiment it may be done by operating a pointing device such as a mouse connected to DSS console 14.

If a line is specified in step S75 or if the selection is made for "create" instead of "edit" in step S73, then CPU 50 reads data for guiding display prompting a selection of a destination from the destination table of FIG. 17 being displayed on the display device 51, displays the guiding display in a part of the screen which has been displayed in step S72 (S76), and waits for selection (S77). Though this selection is done with a cursor key, in another embodiment it may be done by operating a pointing device such as a mouse connected to DSS console 14. When a destination is selected in step S77, CPU 50 writes data based on the information about the selected destination in the fields of "THE KIND OF DESTINATION" and "EXTENSION NO." in any of the line of the table shown in FIG. 18 which has been specified in step S74 (in case of editing) or of the first line or the new line in the course of setting (in case of creating) and writes and displays the source address selected in the process of the flow chart shown in FIG. 20 in the relevant field. Then, CPU 50 read from main memory 53 data for guiding display prompting a selection of whether the setting is to be terminated and displays the guiding display in a part of the above described display (S78).

Subsequently, the process as shown in FIG. 20 is continued till an input indicating completion is done in step S70. At the time of the completion, data have been set in the table in FIG. 18, for example, as shown in the figure. Then, CPU 50 examines the source addresses in the SOURCE ADDRESS field in FIG. 18 and finds successive digits which start from the head of address and consist of numerals common to all the addresses to make the number of the digits the starting digit S (S79). Further, CPU 50 finds the maximum number of digits of the registered source addresses, N, to obtain the analysis-target number length as "N-S". On the basis of thus obtained analysis-target number starting digit and number length, CPU 50 determines analysis-target numbers from the source addresses to complete the memory table In FIG. 7 (S80). For example, if the source address are 01, 02, . . . , 09 as shown in FIG. 18, both of the analysis-target number starting digit and the analysis-target number length will become "1" to yield the analysis-target numbers 1, 2, . . . , 9. The resultant data which correspond to the memory table in FIG. 7, the starting digit and the analysis-target number length are transmitted to the central controller 20 of PBX through RS-232C interface circuit 57. And, the central controller 20 of PBX updates the destination table of FIG. 7 accordingly and terminates the setting.

As described above, process for setting destinations associating each destination with the area of the source address is easily done. Nonnecessity of memorizing area codes or area names in detail nor consulting a telephone directory for input facilitates a necessary setting.

It should be noted that this process for setting destinations associating each destination with the area of the source address may be done not only from DSS console 14 but also from extension terminals 1-1 through 1-m or key-telephones as shown in FIG. 3. The setting operation of this case is the same as that of the case in which DSS console 14 is used. Also, a timer circuit 60 shown in FIG. 16 clocks the present time. The time at the area of the source address when the source address is received is calculated from the time when the source address is received and the time differential with respect to the area of the source address which is received through control process of CPU 50 from memory means 13 shown in FIG. 2, and is sent to the host computer shown in FIG. 2. This feature enables time-considered greetings for example in a call of a case when the area associated with its source address is a foreign country in tele-marketing for which an ACD system as described above is adopted. Also, data relating to time may be displayed by LCDs 38 of extension terminals 1-1 through 1-m shown in FIG. 3 or the display device 51 of DSS console 14 shown in FIG. 16. Such data may be output as hard copy printed by the printer 62 shown in FIG. 16.

In order to obtain information on carriage and/or postage of mails and/or goods associated with an area (e.g., a foreign country) of the source address in tele-marketing, information on carriage and postage associated with the area of the source address can be received by control operation of CPU 50 from main memory 13 shown in FIG. 2 and transfer it to the host computer 17 shown in FIG. 2.

In this case, information on exchange rate may be read out from main memory 13, exchange calculation being done with the rate, and the result being sent to the host computer 17. Further, information on tax (sales or purchase tax) may be read out from main memory 13, tax calculations being done with the information, and the result being sent to the host computer 17.

Figure 16:
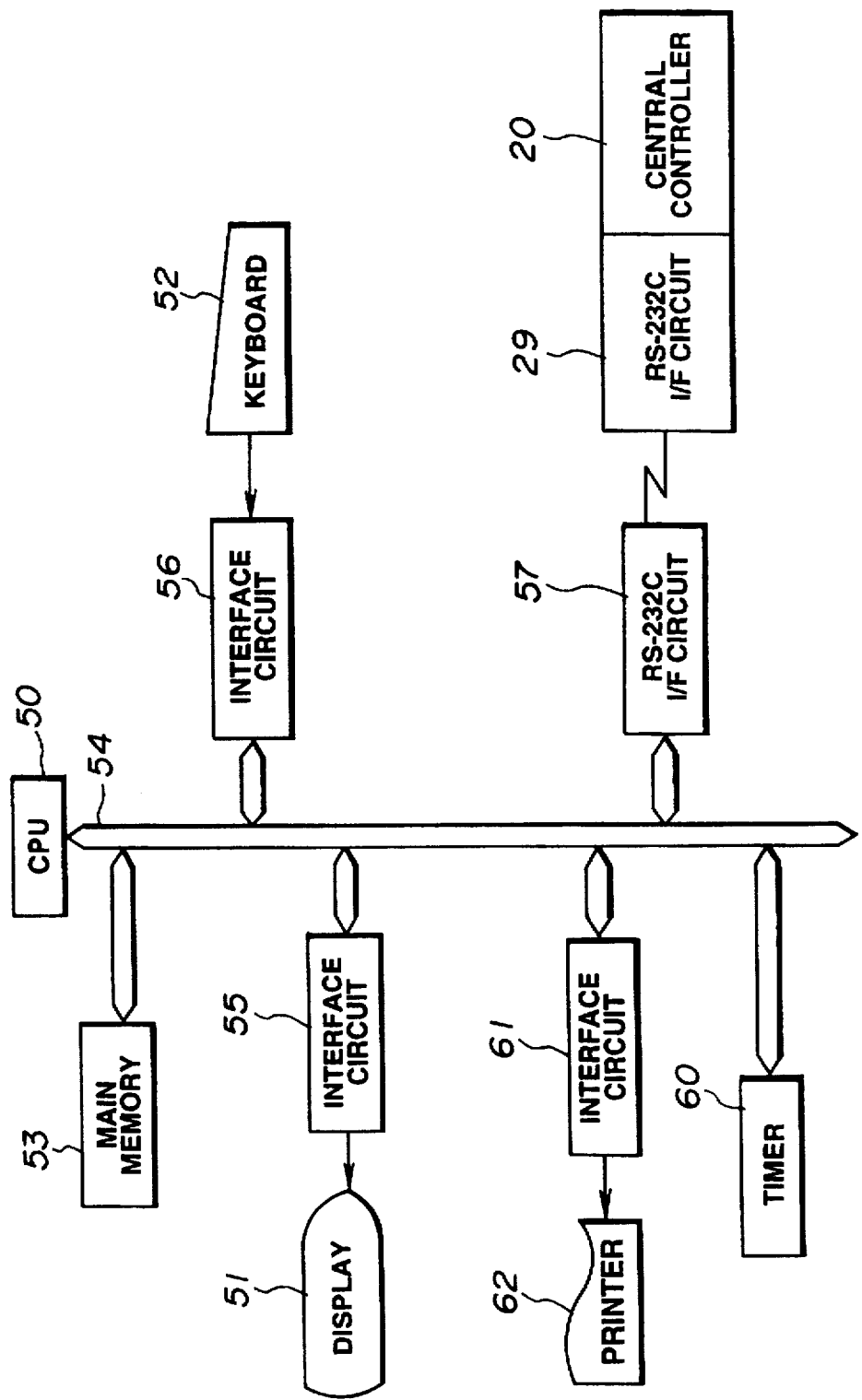
FIG. 16 is a block diagram showing an electrical arrangement of the DSS console of FIG. 15.

Also in this case, information on carriage, postage, exchange rate, tax (sales or purchase tax) associated with the area can be displayed by LCDs 38 of extension terminals 1-1 through 1-m shown in FIG. 3 or the display device 51 of DSS console 14 shown in FIG. 16 for the purpose of easy understanding. Furthermore, such information may be output as hard copy printed by the printer 62 shown in FIG. 16, and at the same time it may be sent automatically as synthetic voice in a language of a country associated with a found source address from a voice synthesizer circuit 18 through a central controller 20, a channel switch 12, a trunk circuit 5 and a trunk 6-j (j=1, 2, ... n). If the source address is received from a mobil telephone such as a cellular telephone system, then the central controller 20 suspends control operation based on the source address except for an ordinary switching operation when the source address of such mobil telephone has been set. This is because such address from a mobil telephone including no information on the current moving point prevents operations for which it is necessary to take into account the area based on the source address. Also, information indicating the suspension of control operation may be displayed on LCD 38 of extension terminal 1-i shown in FIG. 3 or on the screen of the display device 51 of DDS console 14 shown in FIG. 16. Further, 21 such information may be output as hard copy printed with the printer 62 shown in FIG. 16, and may be output in voice saying for example "This call is from a mobil telephone," by the central controller 20 driving the voice synthesizer circuit 18 through the central controller 20, a channel switch 12 and extension circuit 11-i from a speaker 34 of extension terminal 1-i shown in FIG. 3.

Also, in another embodiment, the extension terminals 1-1 through 1-m are classified by source addresses. When an incoming call is detected, terminal information stored in main memory 13 is read based on the received source address to invoke the resultant extension terminal 1-i. For example, if a call is from the business department of the head office of a company for example, the call may be connected to an extension terminal 1-i of the shipping department, of the factory, associated with the source address of the call. Furthermore, by classifying the source address by companies, in response to an incoming call from a company, the call can be connected to a extension terminal 1-i of the department in charge of the company on the basis of the source address of the call. In this case, there is no need to use a direct in-line method in analog lines, a global termination method in ISDN lines, a direct dialing-in method in analog lines or direct in-dialing method in ISDN lines.

Also, in another embodiment, if a call is from the business department of the head office of a company for example, the call is connected to the extension terminal 1-i, in the shipping center, associated with the area of the source address of the call. In this case, a call can be connected to the extension terminal 1-i assigned to the shipping section for the area of the source address.

In addition to an application in companies, a terminating connection of a call to an extension terminal 1-i can be made in such a way that the source addresses are classified by individuals, and according to the classification the extension terminals 1-1 through 1-m are classified. Data involved in this process (companies, departments, and individuals) may be displayed by LCDs 38 of extension terminals 1-1 through 1-m shown in FIG. 3 or by the display device 51 of DSS console 14 shown in FIG. 16. The data may also be output as hard copy printed with the printer 62 shown in FIG. 16. And, the data may also be output in voice by the central controller 20 driving the voice synthesizer circuit 18 from the speaker 34 of extension terminal 1-i shown in FIG. 3.

Furthermore, the central controller 20 operates so as to select either a key telephone or facsimile set in extension terminal 1-i on the basis of the source address of a relevant call and cause the selected set to terminate the call. When a facsimile set is selected, a lamp for facsimile termination on the extension terminal 1-i is made to light enabling a quick recognition of facsimile termination.

Alternatively, the central controller 20 transfers a call to be terminated by extension terminal 1-i on the basis of the source address by calling a telephone number set in main memory 13 beforehand from DSS console 14.

What is claimed is:

1. A system for allocating an incoming call to a desired one of a plurality of destination candidates in response to data in at least one predetermined category concerning a caller of said incoming call in a private switched telephone system in which an exchange is connected to said plurality of destination candidates and has at least one trunk connected to a public switched telephone network (PSTN), said PSTN providing a source address of said caller with said incoming call, the allocating system comprising:

means for registering a correspondence between data in said at least one predetermined category concerning each of prospective callers and a desired one of said plurality of destination candidates to generate a destination information table, each record of said table containing as an entry an analysis target part of a source address of each of said prospective callers and further comprising at least an identification of said desired one of said destination candidates; and means, activated after a completion of operation of said registering means, for allocating said incoming call to the destination candidate associated in said destination information table with the entry identical to said analysis target part of said source address provided from said PSTN.

2. The system as defined in claim 1, wherein each of a whole or part of said plurality of destination candidates is a group of extensional terminals under the control of an automatic call distribution (ACD) system, and each of the rest of said plurality of destination candidates is an extension terminal, and wherein said means for allocating said incoming call comprises:

means, responsive to a determination that said destination candidate to which said incoming call has been allocated is an ACD group, for controlling said exchange to connect said incoming call to one of extension terminals of said ACD group according to said ACD system.

3. The system as defined in claim 1, wherein said registering means comprises:

first means for permitting a user to interactively select said data in said at least one predetermined category concerning each of prospective callers from a set of predetermined data in said at least one predetermined category to designate a first correspondence between said selected data of said prospective caller and at least a part of the source address associated with said prospective caller; and second means, responsive to a selection of said data, for permitting the user to interactively select one of said plurality of destination candidates to which the user desires to allocate a call from said prospective caller to register a second correspondence between said at least a part of said source address associated with said prospective caller and an identification of said selected one of said plurality of destination candidates.

4. The system as defined in claim 3, wherein said registering means further comprises:

display means for displaying matters prepared by said first and second means; and input means, used by said first and second means, for permitting the user to address a cursor to a desired matter and select said matter on the screen of said display means, wherein said first means includes a caller data table, each record of said caller data table comprising said data in said at least one predetermined category concerning each of said prospective callers and said at least a part of the source address of said each of said prospective callers, and wherein said second means includes a list of said plurality of destination candidates.

5. The system as defined in claim 3, wherein:

said at least one predetermined category is a district, a prefecture, a city or a town where a call is originated;

said data in said at least one predetermined category is a name of the district, the prefecture, the city or the town;

said analysis target part comprises a part of said source address which represents the district, the prefecture, the city or the town, and wherein said registering means further comprises means, responsive to an input by the user indicating a completion of a series of selections, for examining said at least part of said source address in all of said registered second correspondences to find successive digits which start from a head of said source address and consist of numbers common to all of said at least part of said source address for defining a number of said successive digits as a starting digit of said analysis target part (S) and to find a number of digits of a longest one of said at least part of said source address (N) for defining N-S as a length of said analysis target part, and means for extracting said analysis target part from each of said source address to generate said destination information table.

6. The system as defined in claim 1, wherein said incoming call allocating means comprises:

means, responsive to which of said at least one trunk said incoming call has come through, for selecting one out of a plurality of predetermined termination modes; and means, responsive to a determination that the selected one of said predetermined termination modes is a source address mode, for allocating said incoming call to the destination candidate associated in said destination information table with the entry identical to said analysis target part of said source address provided from said PSTN.

7. The system as defined in claim 1, further comprising:

at least a trunk circuit included in said private switched telephone system, each said at least a trunk circuit being connected to a different one of said at least one trunk, said trunk circuit that has terminated said incoming call being responsive to said incoming call for outputting a respective trunk identification;

a termination mode table having records, each said termination mode table record comprising an identification of each of said at least one trunk and a termination mode associated with said each of said at least one trunk, the identification of each of said at least one trunk being an entry of said each record;

means, responsive to a reception of said trunk identification, for selecting a predetermined termination mode associated with the entry identical with said trunk identification in said termination mode table.

8. The system as defined in claim 1, wherein:

said at least one predetermined category is a district, prefecture, city or town where a call is originated;

said data in said at least one predetermined category is a name of the district, the prefecture, the city or the town; and said analysis target part comprises a part of said source address representing the district, the prefecture, the city or the town.

9. The system as defined in claim 1, further comprising audio response means, activated when said allocating system is to make one of predetermined responses to said caller, for making said one of said predetermined responses in a synthetic voice in a language associated with said caller.

10. The system as defined in claim 1, wherein said correspondence is between each of prospective departments of prospective enterprises and one of said plurality of destination candidates that is associated with said each of said prospective departments of prospective enterprises.

11. The system as defined in claim 10, further comprising:

means for displaying on a screen the names of department and enterprise, an area name or an individual name associated with said source address provided by said PSTN.

12. The system as defined in claim 10, further comprising:

means for outputting in synthetic voice the names of department and enterprise, an area name or an individual name associated with said source address provided by said PSTN.

13. The system as defined in claim 10, further comprising:

means for outputting in print the names of department and enterprise, an area name or an individual name associated with said source address provided by said PSTN.

14. The system as defined in claim 1, wherein said correspondence is between an area covered by each of a plurality of departments in a shipping center and one of said plurality of destination candidates that is associated with said each of said plurality of departments.

15. The system as defined in claim 14, further comprising:
means for displaying on a screen the names of department and enterprise, an area name or an individual name associated with said source address provided by said PSTN.

16. The system as defined in claim 14, further comprising:
means for outputting in synthetic voice the names of department and enterprise, an area name or an individual name associated with said source address provided by said PSTN.

17. The system as defined in claim 14, further comprising:
means for outputting in print the names of department and enterprise, an area name or an individual name associated with said source address provided by said PSTN.

18. The system as defined in claim 1, wherein said correspondence is between each of prospective enterprises and one of said plurality of destination candidates that is associated with said each of said prospective enterprises.

19. The system as defined in claim 18, further comprising:
means for displaying on a screen the names of department and enterprise, an area name or an individual name associated with said source address provided by said PSTN.

20. The system as defined in claim 18, further comprising:
means for outputting in synthetic voice the names of department and enterprise, an area name or an individual name associated with said source address provided by said PSTN.

21. The system as defined in claim 18, further comprising:
means for outputting in print the names of department and enterprise, an area name or an individual name associated with said source address provided by said PSTN.

22. The system as defined in claim 1, further comprising means responsive to an allocation by said incoming call allocating means for transferring said incoming call to a line, said line having a telephone number preset by a user in association with said source address provided by said PSTN.

23. The system as defined in claim 1, wherein:
said source address provided by said PSTN is an originating phone number used in a facsimile transmission process in analog telephone public lines.

24. The system as defined in claim 1, wherein:
said source address provided by said PSTN is an originating phone number in an Integrated Services Digital Network (ISDN).

25. The system as defined in claim 1, wherein:
said incoming call allocating means further comprises means for transmitting at least information on a source address transmitted from said PSTN to an external device.

26. The system as defined in claim 1, further comprising:
timer means for timing the present time;
time differential memory means for storing a time differential with respect to each area; and
local time calculating means for calculating the local time for a source address from the present time and the time differential with respect to the area of the source address.

27. The system as defined in claim 26, further comprising display means, wherein:
time information based on time differentials, carriage and postage information by countries, exchange rate information and tax information by countries are displayed by said display means.

28. The system as defined in claim 26, further comprising:
printing means for printing time information based on time differentials, carriage and postage information by countries, exchange rate information and tax information by countries.

29. The system as defined in claim 1, wherein:
said each record of said destination information table further comprises the name of a country associated with said source address, each of said prospective callers, and information on the postage and the carriage to said country; and
the method further comprises means for providing information on the postage and the carriage of a country associated in said destination information table with said source address provided by said PSTN.

30. The system as defined in claim 29, further comprising display means, wherein:
time information based on time differentials, carriage and postage information by countries, exchange rate information and tax information by countries are displayed by said display means.

31. The system as defined in claim 29, further comprising:
printing means for printing time information based on time differentials, carriage and postage information by countries, exchange rate information and tax information by countries.

32. The system as defined in claim 1, wherein:
said each record of said destination information table further comprises the name of a country associated with said source address, each of said prospective callers, and information on an exchange rate with respect to said country; and
the method further comprises means for providing information on the exchange rate on a country associated in said destination information table with said source address provided by said PSTN.

33. The system as defined in claim 32, further comprising display means, wherein:
time information based on time differentials, carriage and postage information by countries, exchange rate information and tax information by countries are displayed by said display means.

34. The system as defined in claim 32, further comprising:
printing means for printing time information based on time differentials, carriage and postage information by countries, exchange rate information and tax information by countries.

35. The system as defined in claim 1, wherein:
said each record of said destination information table further comprises the name of a country associated with said source address, each of said prospective callers, and tax information on said country; and
the method further comprises means for providing tax information on a country on the basis of said source address provided by said PSTN.

36. The system as defined in claim 35, further comprising display means, wherein:
time information based on time differentials, carriage and postage information by countries, exchange rate information and tax information by countries are displayed by said display means.

37. The system as defined in claim 35, further comprising:

printing means for printing time information based on time differentials, carriage and postage information by countries, exchange rate information and tax information by countries.

38. The system as defined in claim 1, further comprising:

operation suspending means operative when the source address is originated from a mobile telephone for suspending allocation operation of said incoming call allocating means.

39. The system as defined in claim 38, further comprising:

means operative when the operation suspending means suspends allocation operation of said incoming call allocating means for displaying the suspension of control operation.

40. The system as defined in claim 38, further comprising:

means operative when the operation suspending means suspends allocation operation of said incoming call allocating means for reporting the suspension of control operation in synthetic voice.

41. The system as defined in claim 38, further comprising:

means operative when the operation suspending means suspends allocation operation of said incoming call allocating means for reporting the suspension of control operation in print.

42. The system as defined in claim 1, wherein:

each of said plurality of destination candidates is one of an extension telephone and facsimile set.

43. The system as defined in claim 42, further comprising means for emitting light when said incoming call is allocated to one of said facsimile sets.

44. The system as defined in claim 42, wherein said exchange of the private switched telephone system comprises a private branch exchange (PBX), said PBX comprising a channel switch and a controller with a main memory, the private switched telephone system further comprising a console in communication with said controller, and wherein:

said means for allocating said incoming call is included in said controller;

said registering means is included in said console, and further comprises means, responsive to an input indicating a completion of a series of registrations, for transferring said generated destination information table and analysis target part defining information to said console; and said transferred generated destination information and analysis target part defining information are stored in said main memory of said console.

45. The system as defined in claim 42, wherein said exchange of the private switched telephone system is provided with a controller with a main memory, and wherein:

said means for allocating said incoming call is included in said controller;

said registering means is included in at least one of said plurality of said destination candidates, and further comprises means, responsive to an input indicating a completion of a series of registrations, for transferring said generated destination information table and analysis target part defining information to said console; and said transferred generated destination information and analysis target part defining information are stored in said main memory of said console.

46. A system for allocating an incoming call to a desired one of a plurality of destination candidates in response to data in at least one predetermined category concerning a caller of said incoming call in a private switched telephone system in which an exchange is connected to said plurality of destination candidates, each of said plurality of destination candidates being an extension terminal or a group of extension terminals, said exchange having at least one trunk connected to a public switched telephone network (PSTN), said PSTN providing a source address of said caller with said incoming call, the allocating system comprising:

means for registering a correspondence between data in said at least one predetermined category concerning each of prospective callers and a desired one of said plurality of destination candidates to generate a destination information table, each record of said table containing as an entry an analysis target part of a source address of each of said prospective callers and further comprising at least an identification of said desired one of said destination candidates;

means, activated after a completion of operation of said registering means, for allocating said incoming call to the destination candidate associated in said destination information table with the entry identical to said at least an analysis target part of said source address provided from said PSTN; and means, responsive to a determination that said allocated destination candidate is one of said groups, for automatically distributing said incoming call to one of extension terminals of said one of said groups that has terminated a smallest number of incoming calls among idle ones of said extension terminals.

47. A method for allocating an incoming call to a desired one of a plurality of destination candidates in response to data in at least one predetermined category concerning a caller of said incoming call in a private switched telephone system in which an exchange is connected to said plurality of destination candidates and has at least one trunk connected to a public switched telephone network (PSTN), said PSTN providing a source address of said caller with said incoming call, the method comprising the steps of:

registering a correspondence between data in said at least one predetermined category concerning each of prospective callers and a desired one of said plurality of destination candidates to generate a destination information table, each record of said table containing as an entry an analysis target part of a source address of each of said prospective callers and further comprising at least an identification of said desired one of said destination candidates; and after said registering step, allocating said incoming call to the destination candidate associated in said destination information table with the entry identical to said analysis target part of said source address provided from said PSTN.

48. The method as defined in claim 47, wherein each of a whole or part of said plurality of destination candidates is a group of extensional terminals under the control of an automatic call distribution (ACD) method, and each of the rest of said plurality of destination candidates is an extension terminal, and wherein said step for allocating said incoming call comprises a step of:

controlling said exchange, in response to a determination that said destination candidate to which said incoming call has been allocated is an ACD group, to connect said incoming call to one of extension terminals of said ACD group according to said ACD method.

49. The method as defined in claim 47, wherein said registering step comprises:

(1) permitting a user to interactively select said data in said at least one predetermined category concerning each of prospective callers from a set of predetermined data in said at least one predetermined category to designate a first correspondence between said selected data of said prospective caller and at least a part of the source address associated with said prospective caller; and (2) permitting the user, in response to a selection of said data, to interactively select one of said plurality of destination candidates to which the user desires to allocate a call from said prospective caller to register a second correspondence between said at least a part of said source address associated with said prospective caller and an identification of said selected one of said plurality of destination candidates.

50. The method as defined in claim 49, wherein said first step comprises the steps of:

displaying choices comprising said data and a guidance prompting the user to select one of said choices, said choices being displayed from a caller data table, each record of said caller data table comprising said data in said at least one predetermined category concerning each of said prospective callers and said at least a part of the source address of said each of said prospective callers; and permitting the user to address a cursor to a desired one of said displayed choices and to select said desired one, and wherein said second step comprises the steps of:

displaying choices, from a list of said plurality of destination candidates, and a guidance prompting the user to select one of said choices, said choices comprising said destination candidates; and permitting the user to address a cursor to a desired one of said displayed choices and select said desired one.

51. The method as defined in claim 49, further comprising the steps of:

determining that said at least one predetermined category is a district, a prefecture, a city or a town where a call is originated;

determining that said data in said at least one predetermined category is a name of the district, the prefecture, the city or the town;

determining that said analysis target part comprises a part of said source address which represents the district, the prefecture, the city or the town, wherein said registering step further comprises the steps of:

examining, in response to an input by the user indicating a completion of a series of selections, said at least part of said source address in all of said registered second correspondences to find successive digits which start from a head of said source address and consist of numbers common to all of said at least part of said source address for defining a number of said successive digits as a starting digit of said analysis target part (S) and to find the number of digits of the longest one of said at least parts of said source address (N) for defining N-S as a length of said analysis target part; and extracting said analysis target part from each of said source address to generate said destination information table.

52. The method as defined in claim 47, wherein said incoming call allocating step comprises the steps of:

selecting one out of a plurality of predetermined termination modes, in response to which of said at least one trunk said incoming call has come through; and allocating said incoming call, in response to a determination that the selected one of said predetermined termination modes is a source address mode, to the destination candidate associated in said destination information table with the entry identical to said analysis target part of said source address provided from said PSTN.

53. The method as defined in claim 47, wherein said step of selecting one out of a plurality of predetermined termination modes comprises a step of:

selecting a predetermined termination mode, in response to a reception of a trunk identification from a trunk circuit which has received said incoming call, said selected predetermined termination mode being associated with the entry identical with said trunk identification from a termination mode table, each record of said termination mode table comprising an identification of each of said at least one trunk as an entry and further comprising a termination mode associated with said each of said at least one trunk.

54. The method as defined in claim 47, further comprising the steps of:

determining that said at least one predetermined category is a district, prefecture, city or town where a call is originated;

determining that said data in said at least one predetermined category is a name of the district, the prefecture, the city or the town; and determining that said analysis target part comprises a part of said source address representing the district, the prefecture, the city or the town.

* * * * *